(12) United States Patent
Suematsu et al.

(10) Patent No.: US 12,091,498 B2
(45) Date of Patent: Sep. 17, 2024

(54) RESIN COMPOSITION, MOLDED BODY, OPTICAL LENS, AND OPTICAL LENS UNIT

(71) Applicant: MITSUBISHI GAS CHEMICAL COMPANY, INC., Tokyo (JP)

(72) Inventors: Mitsutake Suematsu, Tokyo (JP); Atsushi Motegi, Tokyo (JP); Kentaro Ishihara, Tokyo (JP); Katsushi Nishimori, Tokyo (JP); Shinya Ikeda, Tokyo (JP); Noriyuki Kato, Tokyo (JP); Mitsuteru Kondo, Tokyo (JP); Kensuke Oshima, Tokyo (JP); Masahiro Kanda, Tokyo (JP); Shoko Suzuki, Tokyo (JP); Tatsunobu Ogata, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 648 days.

(21) Appl. No.: 17/413,984

(22) PCT Filed: Dec. 23, 2019

(86) PCT No.: PCT/JP2019/050233
§ 371 (c)(1),
(2) Date: Jun. 15, 2021

(87) PCT Pub. No.: WO2020/137926
PCT Pub. Date: Jul. 2, 2020

(65) Prior Publication Data
US 2022/0025110 A1 Jan. 27, 2022

(30) Foreign Application Priority Data
Dec. 27, 2018 (JP) ................... 2018-245787

(51) Int. Cl.
| | | |
|---|---|---|
| C08G 61/04 | (2006.01) | |
| C08K 5/06 | (2006.01) | |
| C08K 5/12 | (2006.01) | |
| G02B 1/04 | (2006.01) | |

(52) U.S. Cl.
CPC ............... *C08G 61/04* (2013.01); *C08K 5/06* (2013.01); *C08K 5/12* (2013.01); *G02B 1/041* (2013.01)

(58) Field of Classification Search
CPC ............ C08G 61/04; C08G 2261/1412; C08G 2261/1426; C08G 2261/3324; C08G 2261/418; C08G 2261/57; C08G 61/08; C08K 5/06; C08K 5/12; C08K 5/09; G02B 1/041; C08L 65/00
See application file for complete search history.

(56) References Cited

U.S. PATENT DOCUMENTS

| | | | |
|---|---|---|---|
| 5,516,456 A * | 5/1996 | Shinohara ......... | G02F 1/133305 349/84 |
| 9,617,418 B2 * | 4/2017 | Sakaki ................ | C08L 69/00 |
| 9,646,904 B2 * | 5/2017 | Nakagawa .......... | C08K 5/5435 |
| 2015/0285954 A1 | 10/2015 | Ishizuka et al. | |
| 2017/0044312 A1 * | 2/2017 | Kato .................... | C08K 5/005 |
| 2018/0305496 A1 | 10/2018 | Kato et al. | |

FOREIGN PATENT DOCUMENTS

| | | |
|---|---|---|
| EP | 2 918 621 A1 | 9/2015 |
| JP | 2011-37943 A | 2/2011 |
| JP | 2018-35228 A | 3/2018 |

(Continued)

OTHER PUBLICATIONS

Ohtsuki, T. et al., "Development and Commercialization of Hydrogenated Ring-opening Metathesis Polymers", JSR Technical Review No. 108/2001, pp. 19-25.

(Continued)

*Primary Examiner* — Liam J Heincer
*Assistant Examiner* — Zhen Liu
(74) *Attorney, Agent, or Firm* — GREENBLUM & BERNSTEIN, P.L.C.

(57) ABSTRACT

Provided is an optical resin composition for lenses that contains a resin having a structural unit represented by formula (1), and a binaphthalene compound and/or a binaphthalene compound oligomer having a structural unit represented by formula (2). A, p, $K_1$, $K_2$, Z, and q in formula (1) are as described in the present specification. $R_1$-$R_{10}$, a, and b in formula (2) are as described in the present specification.

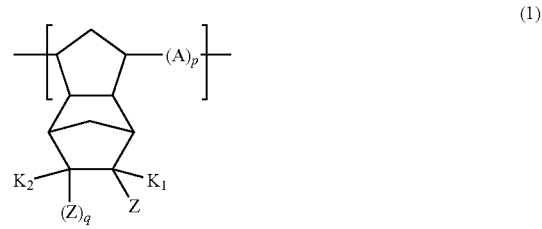

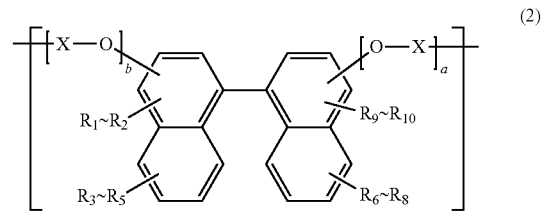

14 Claims, No Drawings

(56) References Cited

FOREIGN PATENT DOCUMENTS

| JP | 2018-177887 A | 11/2018 | |
|---|---|---|---|
| WO | 2014/073496 A1 | 5/2014 | |
| WO | WO-2014189124 * | 11/2014 | ............ C08F 220/30 |
| WO | WO-2014189124 A1 * | 11/2014 | ............ C08F 220/30 |
| WO | 2016/147847 A1 | 9/2016 | |
| WO | 2017/078075 A1 | 5/2017 | |

OTHER PUBLICATIONS

International Search Report issued in International Patent Application No. 62358, dated Mar. 24, 2020, along with English translation thereof.
Written Opinion of the International Searching Authority issued in International Patent Application No. PCT/JP2019/050233, dated Mar. 24, 2020, along with English translation thereof.

* cited by examiner

RESIN COMPOSITION, MOLDED BODY, OPTICAL LENS, AND OPTICAL LENS UNIT

TECHNICAL FIELD

The present invention relates to a resin composition, in particular, an optical resin composition useful as optical parts such as an lens. In addition, the present invention relates to a molded body, an optical lens, an optical lens unit and the like using the optical resin composition.

BACKGROUND ART

Optical resins are used as materials of optical parts such as optical lenses used in optical systems of various cameras such as smartphones, digital still cameras (DSC), automotive camera lenses, video cameras and the like. Optical resins used for such usage are required to have high refractive index, low Abbe number, excellent heat resistance, transparency and the like.

For example, a predetermined cyclic olefin-based resin (Non-patent document 1), an optical resin containing a fluorene compound (Patent document 1), a polycarbonate resin and the like have been developed as such resin materials or resins for optical application (Patent document 2).

PRIOR ART DOCUMENTS

Patent Documents

Patent document 1: WO2016/147847
Patent document 2: WO2014/073496

Non-Patent Document

Non-patent document 1: JSR TECHNICAL REVIEW No. 108/2001

SUMMARY OF INVENTION

Problems to be Solved by Invention

Production of optical parts such as optical lenses requires a step of molding an optical resin. Therefore, the optical resin is required to have excellent moldability as well as the various favorable properties mentioned in the background section. Conventional optical resins did not always have excellent moldability in addition to their optical characteristics.

Thus, a novel optical resin is desired which has excellent moldability that does not cause any molding defect while maintaining favorable optical properties such as high refractive index.

Means for Solving Problem

The present invention provides the following optical resin composition and else which are useful as optical parts such as an lens.

[1] An optical resin composition comprising:
a resin having a structural unit represented by Formula (1) below; and
a binaphthalene compound having a structure represented by Formula (2) below and/or an oligomer thereof:

[Chemical formula 1]

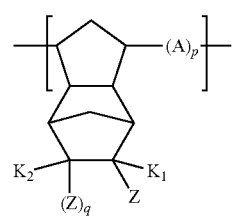

(1)

(in Formula (1),

A represents a C1-C5 alkylene group, p represents 0 or 1, $K_1$ represents a hydrogen atom or a C1-C5 alkyl group, $K_2$ represents a hydrogen atom, a C1-C5 alkyl group or a C6-C20 aryl group, Z each independently represent a carboxyl group, an alkoxycarbonyl group, a cycloalkyloxycarbonyl group, an aryloxycarbonyl group, a hydroxyalkylcarbonyl group, a glycidyloxycarbonyl group, a cyano group or an amide group, and q represents 0 or 1); and

[Chemical formula 2]

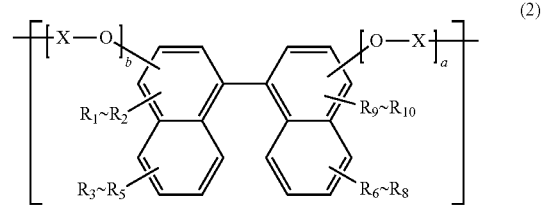

(2)

(in Formula (2), $R_1$-$R_{10}$ each independently represent a hydrogen atom, a fluorine atom, a chlorine atom, a bromine atom, an iodine atom, a C1-C6 alkyl group, a C6-C20 aryl group which may contain a heterocyclic atom selected from O, N and S, a C2-C10 alkenyl group, a C2-C10 alkynyl group, a C1-C6 alkoxy group or a C7-C17 aralkyl group, provided that the alkyl group, the aryl group, the alkenyl group, the alkynyl group, the alkoxy group and the aralkyl group may be substituted with a cyano group, and that the alkyl group, the alkenyl group, the alkynyl group, the alkoxy group and the aralkyl group may be substituted with a phenyl group, X each independently represent a C1-C8 alkylene group, a C5-C12 cycloalkylene group or a C6-C20 arylene group, and a and b each independently represent an integer of 1-10.)

[2] The optical resin composition according to [1] above, wherein, in Formula (1), A is an ethylene group, p is 1, $K_1$ is a hydrogen atom or a methyl group, $K_2$ is a hydrogen atom, and Z is selected from any substituent of Formula (3) below:

[Chemical formula 3]

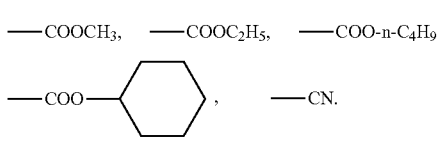  (3)

[3] The optical resin composition according to either one of [1] and [2] above, wherein the ratio of Mass A of the resin having a structural unit represented by Formula (1) to Total mass B of the binaphthalene compound represented by Formula (2) and the oligomer thereof is A/B (mass ratio)=99/1–80/20.

[4] The optical resin composition according to any one of [1]-[3] above, wherein the binaphthalene compound comprises a compound represented by Formula (4) or (5) below:

[Chemical formula 4]

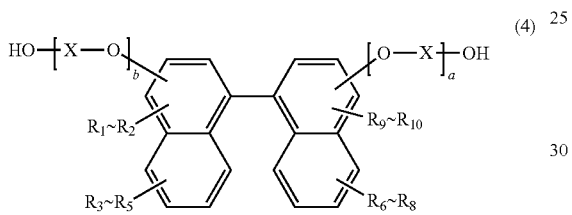  (4)

(in Formula (4), $R_1$-$R_{10}$, a and b are synonymous with $R_1$-$R_{10}$, a and b in Formula (1)); and

[Chemical formula 5]

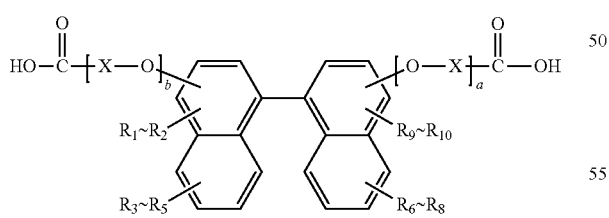  (5)

(in Formula (5), $R_1$-$R_{10}$, a and b are synonymous with $R_1$-$R_{10}$, a and b in Formula (1).)

[5] The optical resin composition according to any one of [1]-[4] above, wherein the binaphthalene compound comprises at least one of the compounds represented by Formulae (2-1)-(2-5) below:

[Chemical formula 6]

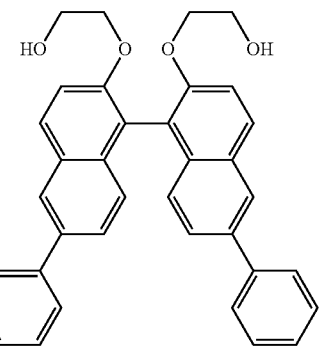  (2-1)

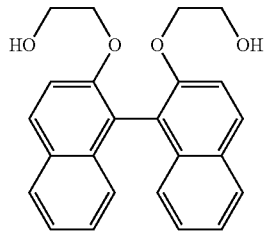  (2-2)

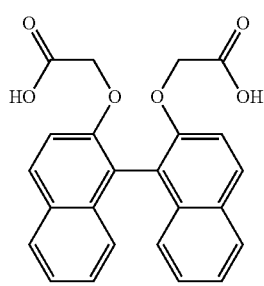  (2-3)

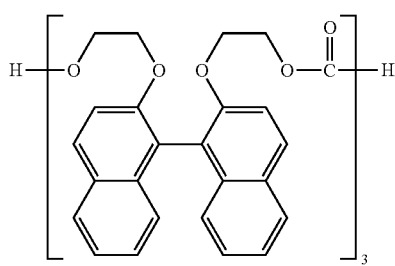  (2-4)

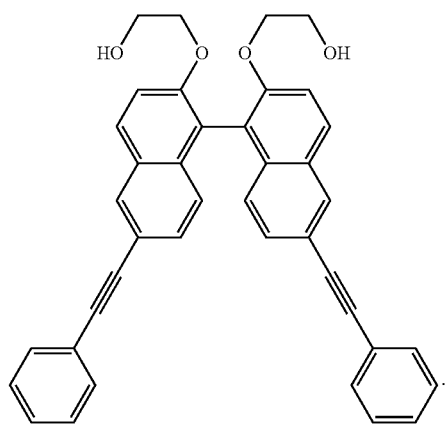  (2-5)

[6] The optical resin composition according to any one of [1]-[5] above, wherein the molecular weight (Mw) of the oligomer is 5,000 or less.

[7] The optical resin composition according to any one of [1]-[6] above, wherein the molecular weight (Mw) of the resin is 10,000 or more but not more than 60,000.

[8] The optical resin composition according to any one of [1]-[7] above, wherein the refractive index in accordance with JIS-B-7071 is 1.510-1.600.

[9] The optical resin composition according to any one of [1]-[8] above, wherein the Abbe number in accordance with JIS-B-7090 is 35-50.

[10] The optical resin composition according to [1]-[9] above, wherein the MVR value in accordance with JIS-B-7210 under the conditions of 260° C. and 2.16 kg is 8-30 (cm$^3$/10 min).

[11] The optical resin composition according to any one of [1]-[10] above, which is a resin composition for lenses.

[12] A molded body comprising the optical resin composition according to any one of [1]-[11] above.

[13] An optical lens comprising the optical resin composition according to any one of [1]-[12] above.

[14] An optical lens unit comprising the optical lens according to [13] above.

Advantageous Effect of Invention

A resin composition for lenses according to a preferred aspect of the present invention can have, in particular, improved moldability than conventional resin compositions, while realizing excellent optical characteristics. Accordingly, the resin composition for lenses can prevent occurrence of surface defects, for example, flow marks, on a molded body such as a lens obtained by molding.

Furthermore, the resin composition for lenses according to the preferred aspect of the present invention can realize superior moldability and optical characteristics with a relatively inexpensive resin material.

EMBODIMENTS FOR CARRYING OUT THE INVENTION

A resin composition for lenses of the present invention comprises a resin containing a structural unit represented by Formula (1) above which has an alicyclic backbone, and a binaphthalene compound having a structure represented by Formula (2) above and/or an oligomer thereof.

Hereinafter, a resin composition for lenses according to the present invention will be described in detail.

1. Resin Having Alicyclic Backbone (Structural Unit Represented by Formula (1))

A resin used in the present invention has a structural unit represented by Formula (1) (hereinafter, the resin used in the present invention is also referred to as the resin of Formula (1)), and contains an alicyclic backbone as follows.

[Chemical formula 7]

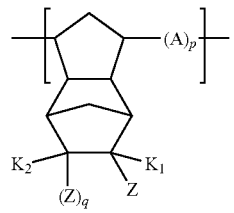

(1)

In Formula (1), A represents a C1-C5 alkylene group, preferably a C1-C3 alkylene group, and more preferably a C2 ethylene group;

p represents 0 or 1, preferably 1;

$K_1$ represents a hydrogen atom or a C1-C5 alkyl group, preferably a hydrogen atom or a C1-C3 alkyl group, and more preferably a hydrogen atom or a C1 or C2 alkyl group;

$K_2$ represents a hydrogen atom, a C1-C5 alkyl group or a C6-C20 aryl group, preferably a hydrogen atom, a C1-C3 alkyl group or a C6-C12 aryl group, more preferably a hydrogen atom, a C1 or C2 alkyl group or a C6-C10 aryl group, and still more preferably a hydrogen atom, a methyl group or a C6-C8 aryl group;

Z each independently represent a carboxyl group, an alkoxycarbonyl group, a cycloalkyloxycarbonyl group, an aryloxycarbonyl group, a hydroxyalkylcarbonyl group, a glycidyloxycarbonyl group, a cyano group or an amide group, preferably a C2-C8 carboxyl, alkoxycarbonyl, aryloxycarbonyl, hydroxyalkylcarbonyl or glycidyloxycarbonyl group, a C4-C10 cycloalkyloxycarbonyl group or a C1 cyano group;

More preferably, Z represents a C2-C6 carboxyl, alkoxycarbonyl or hydroxyalkylcarbonyl group or a C6-C8 a cycloalkyloxycarbonyl group; and q represents 0 or 1, preferably 0.

In Formula (1) of a preferred embodiment of the resin of Formula (1), A is an ethylene group, p is 1, $K_1$ is a hydrogen atom or a methyl group, more preferably a methyl group, $K_2$ is a hydrogen atom, and Z are each independently selected from any of the substituents of Formula (3) below.

[Chemical formula 8]

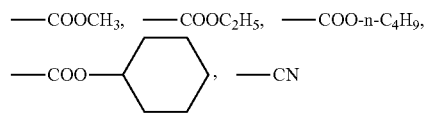

(3)

Moreover, a preferable example of the resin of Formula (1) includes, specifically, a polymer containing a structural unit represented by Formula (1-1) below.

[Chemical formula 9]

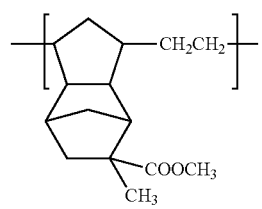

(1-1)

The resin of Formula (1) preferably has a molecular weight (Mw) of 10,000 or more but not more than 60,000, more preferably a molecular weight (Mw) of 20,000 or more but not more than 50,000, and still more preferably a molecular weight (Mw) of 30,000 or more but not more than 50,000.

The resin of Formula (1) preferably has a glass transition temperature (Tg) of 150° C. or higher but not higher than 180° C., and more preferably a glass transition temperature (Tg) of 160° C. or higher but not higher than 170° C. Herein, the glass transition temperature (Tg) refers to a value obtained according to JIS-K-7121.

The MVR value of the resin of Formula (1) is preferably 5-40 (cm³/10 min), and more preferably 10-25 (cm³/10 min). Herein, MVR refers to a value obtained in accordance with JIS-B-7210 under the conditions of 260° C. and 2.16 kg.

In addition, the refractive index of the resin of Formula (1) is preferably 1.500-1.532 and more preferably 1.520-1.530.

In addition to the above-described structural unit represented by Formula (1), the resin of Formula (1) may contain any of structural units represented by Formulae (A-1)-(A-3) below. In Formulae (A-1)-(A-3), Ra are each independently an alkylene group with a total carbon number of 1-10 which may have a substituent and a branched chain. Ra is, for example, a methylene group, an ethylene group, a propylene group or the like, preferably an ethylene group.

[Chemical formula 10]

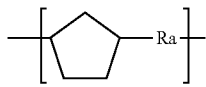

(A-1)

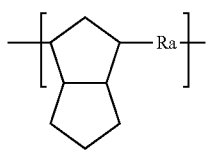

(A-2)

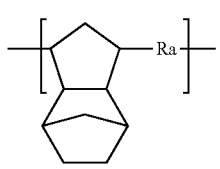

(A-3)

If the resin of Formula (1) has such a structural unit in addition to the above-described structural unit represented by Formula (1), the resin of Formula (1) containing these structural units is, for example, a random copolymer or a block copolymer, preferably a random copolymer. In addition, if a structural unit is contained in addition to the above-described structural unit represented by Formula (1), the resin of Formula (1) contains preferably 50 mol % or more, more preferably 70 mol % or more and particularly preferably 90 mol % or more of the structural unit represented by Formula (1).

2. Binaphthalene Compound or Oligomer Containing Binaphthalene Backbone (Structure Represented by Formula (2))

A binaphthalene compound and/or oligomer used in the present invention has a structure represented by Formula (2) (hereinafter, the binaphthalene compound and/or the oligomer used in the present invention are also referred to as the compound of Formula (2) or the oligomer of Formula (2)), and contains a binaphthalene backbone as follows.

[Chemical formula 11]

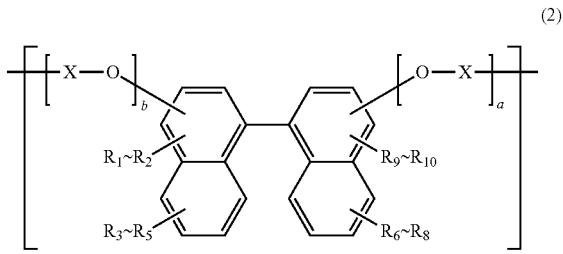

(2)

In Formula (2), $R_1$-$R_{10}$ each independently represent a hydrogen atom, a fluorine atom, a chlorine atom, a bromine atom, an iodine atom, a C1-C6 alkyl group, a C6-C20 aryl group which may contain a heterocyclic atom selected from O, N and S, a C2-C10 alkenyl group, a C2-C10 alkynyl group, a C1-C6 alkoxy group or a C7-C17 aralkyl group.

Preferably, $R_1$-$R_{10}$ are each independently any of a hydrogen atom, a C1-C6 alkyl group or a C6-C20 aryl group which may contain a heterocyclic atom, more preferably any of a hydrogen atom, a C1-C4 alkyl group or a C6-C12 aryl group without a heteroatom, and still more preferably any of a hydrogen atom, a C1-C3 alkyl group or a C6-C8 aryl group without a heteroatom.

Furthermore, if $R_1$-$R_{10}$ are an alkyl group, an aryl group, an alkenyl group, an alkynyl group, an alkoxy group or an aralkyl group, each of them may have a substituent, for example, a fluorine atom, a chlorine atom, a bromine atom, an iodine atom, a cyano group or a phenyl group. Moreover, a substituent of an alkyl group may be any of an aryl group, an alkenyl group, an alkoxy group, an aralkyl group or the like, and a substituent of an aryl group may be any of an alkyl group, an alkenyl group, an alkoxy group, an aralkyl group or the like, where the carbon number of these substituents is not included in the carbon number of the above-described alkyl group or aryl group.

X are each independently a C1-C8 alkylene group, a C5-C12 cycloalkylene group or a C6-C20 arylene group, preferably a C1-C8 alkylene group, more preferably a C1-C4 alkylene group, and particularly preferably a C2 or C3 alkylene group.

a and b are each independently an integer of 1-10. a and b are each independently preferably an integer of 1-6, more preferably an integer of 1-4 and still more preferably an integer of 1 or 2.)

The kinds of binaphthalene compounds of Formula (2) used may be the same or different. This also applies to the oligomer of the compound of Formula (2), where oligomers of any one kind of compound of Formula (2) or oligomers of multiple kinds of compounds of Formula (2) may be used. Alternatively, a mixture of one or more kinds of compounds of Formula (2) and oligomers of one or more kinds of compounds of Formula (2) may be used.

Examples of a preferred embodiment of the binaphthalene compound of Formula (2) include binaphthalene compounds represented by Formula (4) or (5), and oligomers of binaphthalene compounds represented by Formula (4) or (5) can also be used favorably.

[Chemical formula 12]

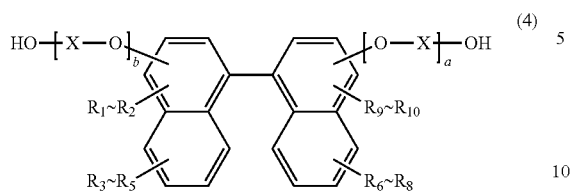
(4)

[Chemical formula 13]

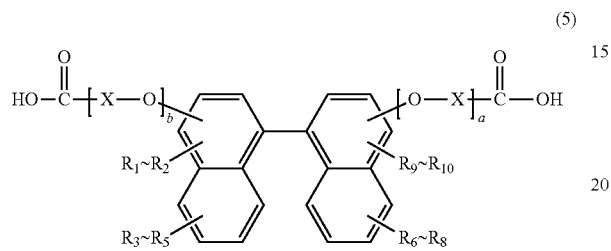
(5)

In Formulae (4) and (5), $R_1$-$R_{10}$, a and b are synonymous with $R_1$-$R_{10}$, a and b in Formula (1) above.

Moreover, preferable examples of the binaphthalene compound or oligomer of Formula (2) include, specifically, compounds or oligomers represented by Formulae (2-1)-(2-11) below. Among them, compounds or oligomers represented by Formulae (2-1)-(2-7) below are particularly preferable.

[Chemical formula 14]

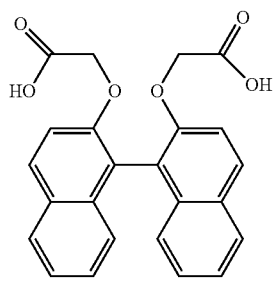
(2-1)

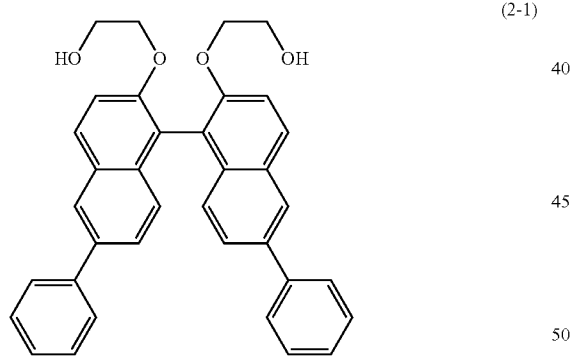
(2-2)

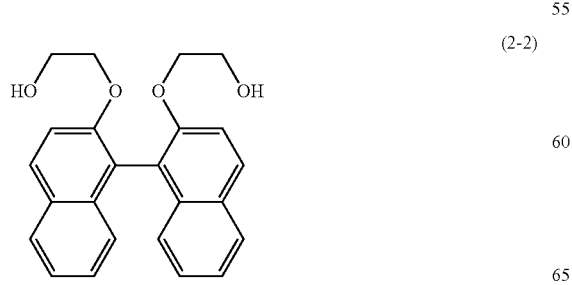
(2-3)

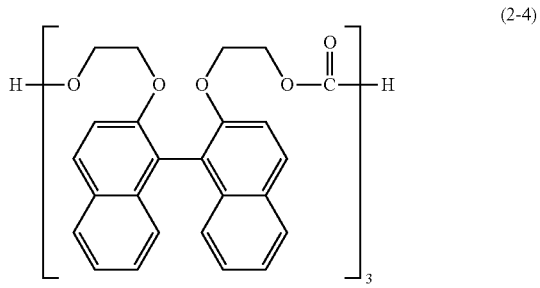
(2-4)

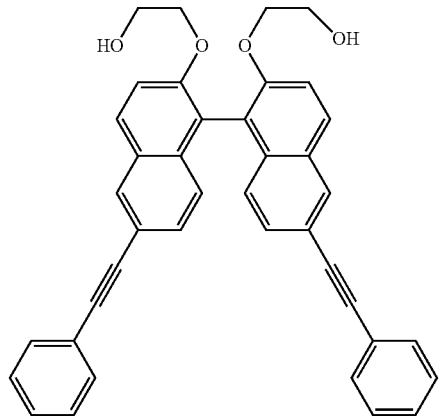
(2-5)

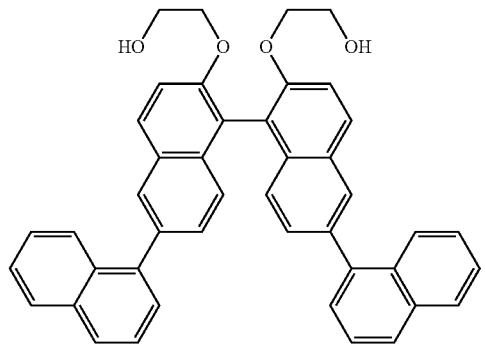
(2-6)

(2-7)

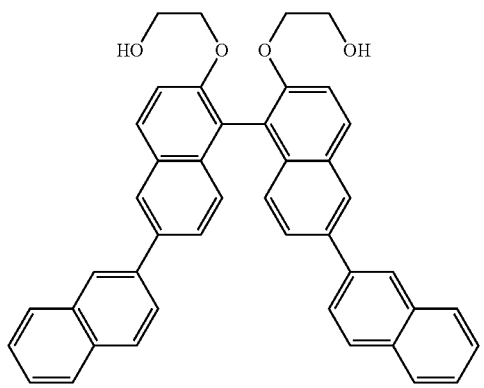

(2-8)

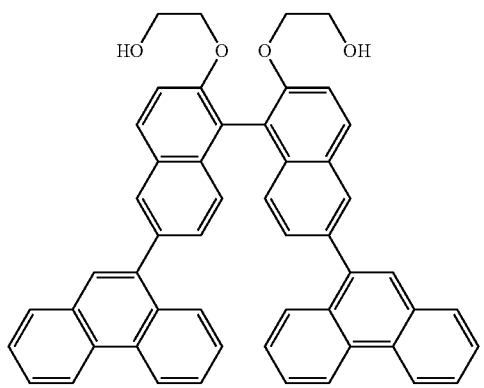

(2-9)

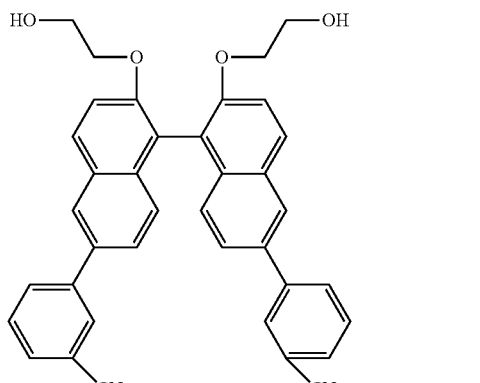

(2-10)

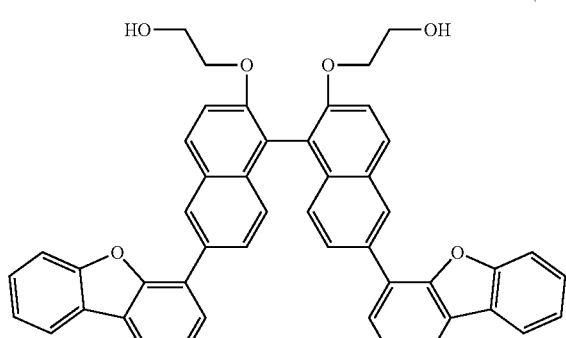

(2-11)

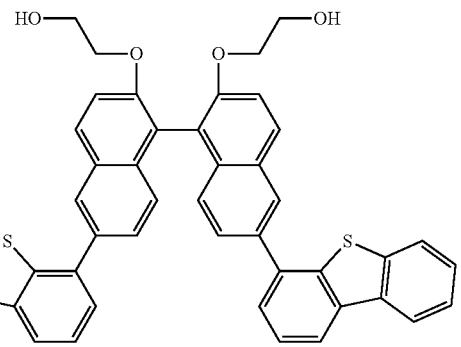

An oligomer of the compound of Formula (2) is, for example, a mixture of a monomer to a decamer of the compound of Formula (2), preferably any of a dimer to a pentamer of the compound of Formula (2), or a mixture thereof.

The molecular weight (weight-average molecular weight: Mw) of the oligomer of the compound of Formula (2) is preferably 5,000 or less, for example, 500-5000. The molecular weight (Mw) of the oligomer of the compound of Formula (2) is more preferably 600-3000, and still more preferably 800-2000.

Preferably, the oligomer of the compound of Formula (2) has a glass transition temperature (Tg) of 100° C. or higher but not higher than 250° C., or a melting point of 100° C. or higher but not higher than 250° C. Herein, a glass transition temperature (Tg) refers to a value obtained according to JIS-K-7121.

In addition to the structure represented by Formula (2) above, the compound or the oligomer of Formula (2) may contain a structure (structural unit) represented by Formula (B) below in a small amount.

In a case where a structural unit represented by Formula (B) is contained in addition to the structural unit represented by Formula (2) above, the structural unit represented by Formula (2) contains the compound or the oligomer of Formula (2) preferably at 70 mol % or more, more preferably at 80 mol % or more and particularly preferably at 90 mol % or more.

[Chemical formula 15]

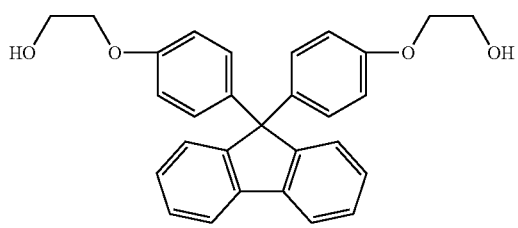

(B)

If the compound or the oligomer of Formula (2) has such a structural unit in addition to the above-described structural unit represented by Formula (2), the oligomer of the compound of Formula (2) containing these structural units is, for example, a random copolymer or a block copolymer, preferably a random copolymer.

3. Optical Resin Composition

An optical resin composition of the present invention comprises the resin of Formula (1) and the compound or the oligomer of Formula (2).

In the optical resin composition, the ratio of Mass A of the resin of Formula (1) to Total mass B of the compound or the oligomer of Formula (2) is preferably A/B (mass ratio)=99/1–80/20 (A:B=99:1–80:20).

A/B (mass ratio) is more preferably 97/3-82/18, still more preferably 95/5-84/16, and particularly preferably 92/8-85/15.

When multiple kinds of resins of Formula (1) are used in a mixture, Mass A of the resin of Formula (1) refers to the total mass of the multiple kinds of resins of Formula (1).

[Other Components]

The optical resin composition may be added with additives as long as the purpose of the present invention is not impaired. For example, additives such as an antioxidant, a processing stabilizer, a light stabilizer, a polymerization-metal deactivator, a flame retardant, a lubricant, an antistatic agent, a surfactant, an antibacterial agent, a mold release agent, a UV absorber, a plasticizer, a compatibilizer or the like may be mixed.

The content of the additives is preferably 10 mass % or less, more preferably 6 mass % or less, still more preferably 6 mass % or less and particularly preferably 2 mass % or less relative to the total mass of the optical resin composition.

Although fluorene compounds are compounds having a molecule structure similar to the binaphthalene compound of Formula (2), the optical resin composition is preferably free of a fluorene compound. As can be appreciated from the results in the following examples and comparative example, this is because an optical resin composition containing the binaphthalene compound of Formula (2) or an oligomer thereof has better moldability than an optical resin composition containing a fluorene compound.

[Properties of Optical Resin Composition]

The refractive index of the optical resin composition is preferably within a range of 1.510-1.600 in accordance with JIS-B-7071. The refractive index of the optical resin composition is more preferably 1.512-1.580, still more preferably 1.515-1.560, and particularly preferably 1.520-1.540.

The Abbe number of the optical resin composition is preferably within a range of 35-50 in accordance with JIS-B-7090. The Abbe number of the optical resin composition is more preferably 36-49, still more preferably 37-47, and particularly preferably 38-46.

The MVR value of the optical resin composition in accordance with JIS-B-7210 under the conditions of 260° C. and 2.16 kg is preferably within a range of 8-30 (cm³/10 min). The MVR value of the optical resin composition is more preferably 10-26 (cm³/10 min), still more preferably 11-25 (cm³/10 min), and particularly preferably 12-24 (cm³/10 min).

4. Molded Body, Optical Lens and the Like Comprising Optical Resin Composition

The optical resin composition of the present invention may be contained in various kinds of molded bodies, in particular, a molded body of optical parts. Furthermore, the optical resin composition is useful as a material of a molded body of optical parts. For example, the optical resin composition of the present invention is particularly useful as a material of an optical lens, and the optical lens containing the optical resin composition of the present invention has excellent characteristics.

Specifically, the optical resin composition of the present invention can be used to produce a lens having a high to moderate refractive index and a moderate Abbe number, without causing a defect upon molding processing.

Thus, an optical lens molded using an optical resin composition having such excellent characteristics can be used favorably in an optical lens unit.

EXAMPLES

Hereinafter, the present invention will be described specifically by way of examples, although the embodiment can be modified suitably as long as the effect of the present invention can be achieved.

<Weight-Average Molecular Weight Relative to Polystyrene Standards (Mw)>

Gel permeation chromatography (GPC) was employed using tetrahydrofuran as an eluent to generate a calibration curve using polystyrene standards with known molecular weights (molecular weight distribution=1). Based on this calibration curve, weight-average molecular weight (Mw) was calculated from the retention time in GPC.

[Measurement Conditions]

Instrument: HLC-8320 GPC manufactured by Tosoh Corporation

Columns: guard column: TSKguardcolumn SuperMPHZ-M×1 column analytical columns: TSKgel SuperMultiporeHZ-M×3 columns Eluent: tetrahydrofuran Injection amount: 10 μL Sample concentration: 0.2 w/v % tetrahydrofuran solution Flow rate of eluent: 0.35 ml/min Measurement temperature: 40° C.

Detector: RI

<Glass Transition Temperature (Tg)>

Glass transition temperature was measured using a differential scanning calorimeter (High Sensitivity Differential Scanning calorimeter DSC7000X). Following melting and cooling for solidification in the differential scanning calorimeter (DSC) where the rates of temperature increase and decrease were set to 10° C./min, Tg was measured during the second heating run (second run).

<Fluidity of Resin (MVR)>

Melt indexer manufactured by Toyo Seiki Seisaku-sho, Ltd. was used to measure fluidity in accordance with the method of JIS-B-7210. Unless otherwise noted, MVR (cm³/10 min) was obtained under the conditions of 260° C. and 2.16 kg.

<Measurement of Refractive Index (Nd)>

Refractive indices were measured using an Abbe refractometer by a method according to JIS-K-7142 for 0.1 mm-thick films made of the resin compositions produced in the examples described in detail below.

<Abbe Number (ν)>

Refractive indices at wavelengths of 486 nm, 589 nm and 656 nm were measured using an Abbe refractometer at 23° C. for 0.1 mm-thick films made of the resin compositions produced in the examples.

Furthermore, Abbe number ν was calculated from the measured refractive indices using the following equation.

$$\nu=(nD-1)/(nF-nC)$$

nD: Refractive index at wavelength of 589 nm
nC: Refractive index at wavelength of 656 nm
nF: Refractive index at wavelength of 486 nm <Measurement of Flow Marks Caused Upon Molding>

10,000 continuous shots of molding were performed by an injection molding machine (FANUC ROBOSHOT S-2000i50B manufactured by Fanuc Corporation) using an aspheric mold at a resin temperature of 300° C. and a mold temperature of [Tg–20° C.] (temperature lower than Tg of the resin by 20° C.) to produce lenses. The surfaces of the resulting molded bodies, i.e., lenses, were visually inspected to confirm the presence of flow marks on the molded bodies.

Flow marks caused upon molding (visual inspection) A: No flow mark

Flow marks caused upon molding (visual inspection) B: Very few flow marks

Flow marks caused upon molding (visual inspection) C: A few flow marks

Flow marks caused upon molding (visual inspection) D: Considerable number of flow marks Example 1

As a resin having a structural unit represented by Formula (1) and a compound represented by Formula (2), 92 parts by mass of pellets of a resin represented by Formula (1-1) below (glass transition temperature (Tg): 164° C., molecular weight (Mw): 45,000) and 8 parts by weight of 2,2'-bis(2-hydroxyethoxy)-6,6'-diphenyl-1,1'-binaphthalene (DP-BHBNA) of Formula (2-1) below were used, respectively. These resin and compound were melt kneaded in a twin-screw extruder (IPT 35 mm co-rotating twin-screw extruder, IPT-35, L/D=38), and the resultant was extruded into a strand, which was cut with a cutter to obtain pellets of the resin composition. Appearance of the resulting resin composition was colorless and transparent.

[Chemical formula 16]

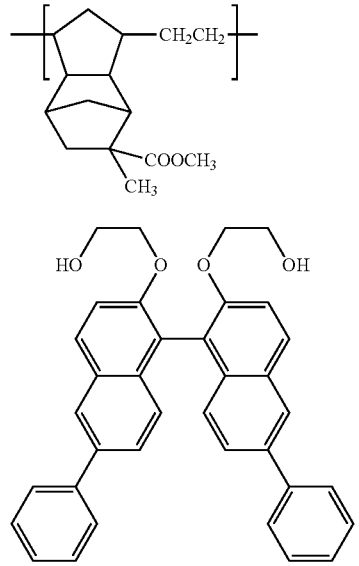

(1-1)

(2-1)

Compound Represented by Formula (2-1) (DP-BHBNA): 2,2-bis(2-hydroxyethoxy)-6,6'-diphenyl-1,1'-binaphthalene Example 2-5

Resin compositions of Examples 2-5 were obtained in the same manner as Example 1 except that a compound or an oligomer represented by Formula (2-2)-(2-4) below was used as the compound represented by Formula (2) or that the content of the compound of Formula (2-1) was changed.

[Chemical formula 17]

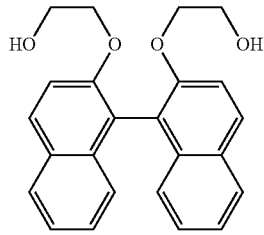

(2-2)

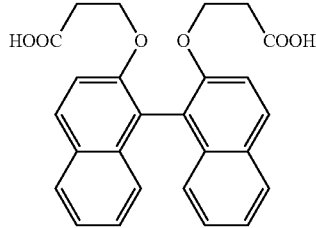

(2-3)

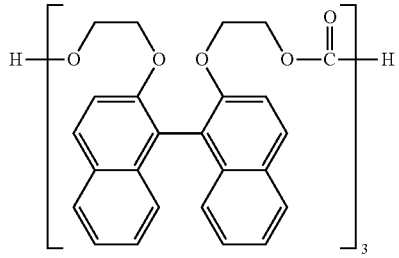

(2-4)

Compound represented by Formula (2-2) (BINOLE-2EO):
2,2-bis(2-hydroxyethoxy)-1,1'-binaphthalene Compound represented by Formula (2-3) (BINOLE-DC):
2,2-([1,1-binaphthalene]-2,2-diylbis[oxy])diacetate Oligomer represented by Formula (2-4) (BNE-3PC):
Trimer of 2,2-bis(2-hydroxyethoxy)-1,1'-binaphthalene (Example of Synthesizing Oligomer Represented by Formula (2-4) (BNE-3PC))

The oligomer used in Example 4 (BNE-3PC) was synthesized as follows.

1.000 mol 2,2-bis(2-hydroxyethoxy)-1,1'-binaphthalene, 1.750 mol diphenyl carbonate and $1 \times 10^{-6}$ mol sodium hydrogen carbonate were placed in a 1-liter reactor equipped with a stirrer and a distillation unit, heated to 200° C. in a nitrogen atmosphere by spending 30 minutes and stirred. Subsequently, temperature and pressure of the reaction system were set to 230° C. and 0.13 kPa, respectively by spending 60 minutes, and stirring was performed for 30 minutes continuously under the same conditions but while introducing nitrogen into the reactor, thereby obtaining an oligomer. Mw of the resulting oligomer (BNE-3PC) was 1,415.

Herein, the number of the repeating units, i.e., "3" (trimer), in Formula (2-4) was calculated by a known method from the weight-average molecular weight relative to polystyrene standards (Mw) and FD-MS.

COMPARATIVE EXAMPLE

In addition, as Comparative example, a resin composition was obtained in the same manner as Example 1 except that a fluorene compound represented by Formula (B) below was used instead of the compound represented by Formula (2).

[Chemical formula 18]

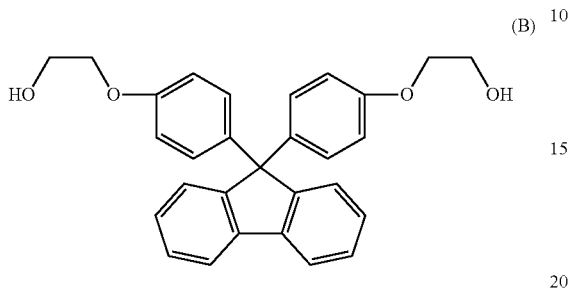

(B)

The physical properties of the resin compositions obtained in Examples 1-5 and Comparative example are shown in Table 1.

TABLE 1

| | Composition | | | | Physical properties | | Optical properties | | Moldability |
|---|---|---|---|---|---|---|---|---|---|
| | Resin | | Compound or oligomer | | | MVR | Refractive | Abbe | |
| | Kind | Content (mass parts) | Kind | Content (mass parts) | Tg (° C.) | cm³/10 min | index (nd) | number (v) | Flow marks (*) |
| Example 1 | Formula (1-1) | 92 | DP-BHBNA (Formula (2-1)) | 8 | 149 | 13 | 1.526 | 45 | A |
| Example 2 | Formula (1-1) | 90 | BINOLE-2EO (Formula (2-2)) | 10 | 135 | 24 | 1.528 | 46 | B |
| Example 3 | Formula (1-1) | 90 | BINOLE-DC (Formula (2-3)) | 10 | 138 | 23 | 1.527 | 46 | B |
| Example 4 | Formula (1-1) | 90 | BNE-3PC (Formula (2-4)) | 10 | 150 | 14 | 1.53 | 46 | A |
| Example 5 | Formula (1-1) | 85 | DP-BHBNA (Formula (2-1)) | 15 | 140 | 18 | 1.539 | 38 | C |
| Comparative example 1 | Formula (1-1) | 85 | BPEF (Formula (B)) | 15 | 140 | 22 | 1.533 | 45 | D |

(*) Flow marks caused upon molding (visual inspection) A: No flow mark
Flow marks caused upon molding (visual inspection) B: Very few flow marks
Flow marks caused upon molding (visual inspection) C: A few flow marks
Flow marks caused upon molding (visual inspection) D: Considerable number of flow marks The optical resin composition according to a preferred aspect of the present invention can have, in particular, improved moldability than conventional resin compositions, while realizing excellent optical characteristics. Accordingly, the optical resin composition can produce a molded body such as a lens having satisfactory optical characteristics without causing a surface defect such as flow marks.

On the other hand, Comparative example that used a fluorene compound was shown to be inferior in moldability.

In addition, although compounds or oligomers used in the examples are superior in optical characteristics such as high refractive index, they are usually expensive. Since the optical resin composition of the present invention can also realize the above-described superior optical characteristics and moldability in an aspect where the contents of these components are minimized, it can also reduce the cost for producing molded bodies.

Thus, a resin composition for lenses according to a preferred aspect of the present invention can realize excellent moldability and optical characteristics by using relatively inexpensive resin materials.

The invention claimed is:

1. An optical resin composition comprising:
   a resin having a structural unit represented by Formula (1) below; and
   a binaphthalene compound having a structure represented by Formula (2) below and/or an oligomer thereof:

[Chemical formula 1]

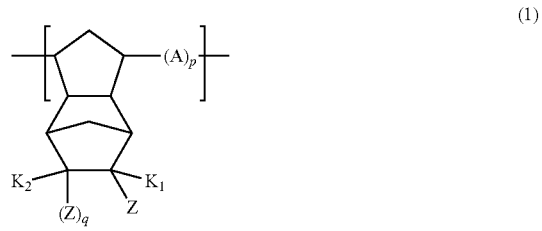

(1)

(in Formula (1),

A represents a C1-C5 alkylene group, p represents 0 or 1,

K1 represents a hydrogen atom or a C1-C5 alkyl group,

K2 represents a hydrogen atom, a C1-C5 alkyl group or a C6-C20 aryl group,

Z each independently represent a carboxyl group, an alkoxycarbonyl group, a cycloalkyloxycarbonyl group, an aryloxycarbonyl group, a hydroxyalkylcarbonyl group, a glycidyloxycarbonyl group, a cyano group or an amide group, and q represents 0 or 1); and

[Chemical formula 2]

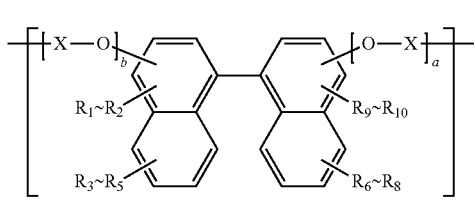

(in Formula (2),
R1-R10 each independently represent a hydrogen atom, a fluorine atom, a chlorine atom, a bromine atom, an iodine atom, a C1-C6 alkyl group, a C6-C20 aryl group which may contain a heterocyclic atom selected from O, N and S, a C2-C10 alkenyl group, a C2-C10 alkynyl group, a C1-C6 alkoxy group or a C7-C17 aralkyl group, provided that the alkyl group, the aryl group, the alkenyl group, the alkynyl group, the alkoxy group and the aralkyl group may be substituted with a cyano group, and that the alkyl group, the alkenyl group, the alkynyl group, the alkoxy group and the aralkyl group may be substituted with a phenyl group, X each independently represent a C1-C8 alkylene group, a C5-C12 cycloalkylene group or a C6-C20 arylene group, and a and b each independently represent an integer of 1-10);

wherein the ratio of Mass A of the resin having a structural unit represented by Formula (1) to Total mass B of the binaphthalene compound represented by Formula (2) and the oligomer thereof is A/B (mass ratio)=99/1–80/20.

2. The optical resin composition according to claim 1, wherein, in Formula (1), A is an ethylene group, p is 1, K1 is a hydrogen atom or a methyl group, K2 is a hydrogen atom, and Z is selected from any substituent of Formula (3) below:

[Chemical formula 3]

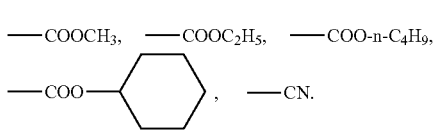

3. The optical resin composition according to claim 1, wherein the ratio A/B (mass ratio)=97/3–82/18.

4. The optical resin composition according to claim 1, wherein the binaphthalene compound comprises a compound represented by Formula (4) or (5) below:

[Chemical formula 4]

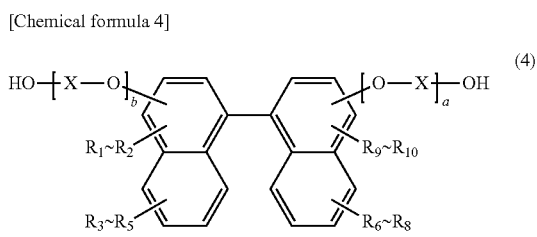

(in Formula (4), R1-R10, a and b are synonymous with R1-R10, a and b in Formula (1)); and

[Chemical formula 5]

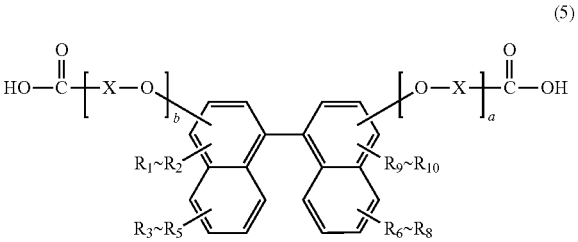

(in Formula (5), R1-R10, a and b are synonymous with R1-R10, a and b in Formula (1)).

5. The optical resin composition according to claim 1, wherein the binaphthalene compound comprises at least one of the compounds represented by Formulae (2-1)-(2-5) below:

[Chemical formula 6]

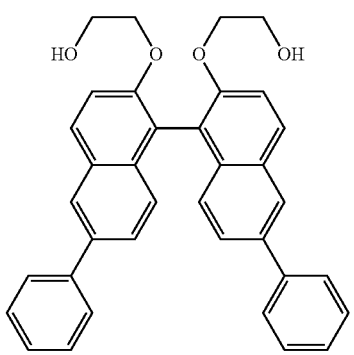

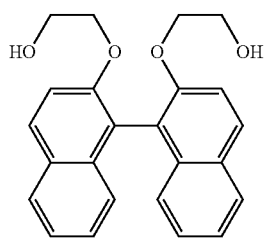

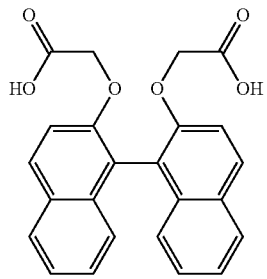

-continued (2-4)
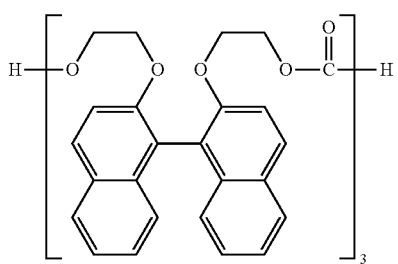

(2-5)
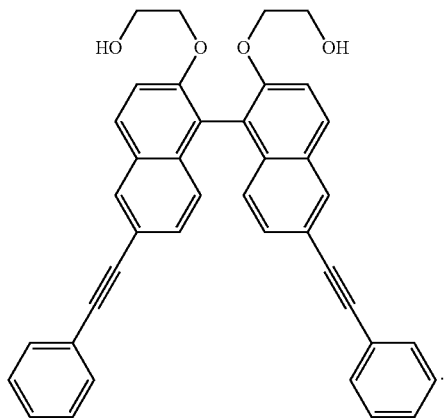

6. The optical resin composition according to claim 1, wherein the molecular weight (Mw) of the oligomer is 5,000 or less.

7. The optical resin composition according to claim 1, wherein the molecular weight (Mw) of the resin is 10,000 or more but not more than 60,000.

8. The optical resin composition according to claim 1, wherein the refractive index in accordance with JIS-B-7071 is 1.510-1.600.

9. The optical resin composition according to claim 1, wherein the Abbe number in accordance with JIS-B-7090 is 35-50.

10. The optical resin composition according to claim 1, wherein the MVR value in accordance with JIS-B-7210 under the conditions of 260° C. and 2.16 kg is 8-30 (cm3/10 min).

11. The optical resin composition according to claim 1, which is a resin composition for lenses.

12. A molded body comprising the optical resin composition according to claim 1.

13. An optical lens comprising the optical resin composition according to claim 1.

14. An optical lens unit comprising the optical lens according to claim 13.

* * * * *